United States Patent

Dugat et al.

[11] Patent Number: 5,814,145
[45] Date of Patent: Sep. 29, 1998

[54] CEMENTATION SLURRIES FOR IMPROVEDLY ENCASING REINFORCING ELEMENTS THEREFOR

[75] Inventors: Jerome Dugat, Montigny-Le-Bretonneux; Laurent Frouin, L'Hay Les Roses; Evelyne Prat, Pantin; Pierre Richard, Neuilly-Sur-Seine, all of France

[73] Assignee: Rhone-Poulenc Chimie, Courbevoie Cedex, France

[21] Appl. No.: 407,628

[22] Filed: Mar. 21, 1995

[30] Foreign Application Priority Data

Mar. 21, 1994 [FR] France ................................. 94 03261

[51] Int. Cl.[6] ................................................. C04B 14/04
[52] U.S. Cl. .......................... 106/737; 106/784; 106/788
[58] Field of Search ............................ 106/643, 819, 106/823, 737, 784, 788

[56] References Cited

U.S. PATENT DOCUMENTS

| | | | |
|---|---|---|---|
| 3,656,985 | 4/1972 | Bonnel et al. | 106/728 |
| 4,495,228 | 1/1985 | Cornwell | 106/708 |
| 4,505,751 | 3/1985 | Sydansk | 166/292 |
| 4,993,884 | 2/1991 | Mueller et al. | 106/737 |
| 5,075,358 | 12/1991 | Riley et al. | 106/689 |
| 5,185,389 | 2/1993 | Victor | 106/689 |
| 5,234,493 | 8/1993 | Dromard et al. | 501/154 |
| 5,366,550 | 11/1994 | Schad | 106/730 |
| 5,498,665 | 3/1996 | Schulze et al. | 106/713 |
| 5,536,310 | 7/1996 | Brook et al. | 106/708 |

FOREIGN PATENT DOCUMENTS

| | | |
|---|---|---|
| 0010777 | 5/1980 | European Pat. Off. . |
| 0289720 | 11/1988 | European Pat. Off. . |
| 0291108 | 11/1988 | European Pat. Off. . |
| 3522677 | 1/1987 | Germany . |

*Primary Examiner*—Paul Marcantoni
*Attorney, Agent, or Firm*—Burns, Doane, Swecker & Mathis, L.L.P.

[57] ABSTRACT

Cementation slurries well suited for encasing reinforcing elements therefor, for example prestressed steel cable, while reducing the risk of embrittlement thereof, contain from about 1.5% to 3% by weight of homogenizing and exudation-reducing hydrophilic particulates (e.g., precipitated silica particles) that are inert in respect of liquids, have a specific surface area of greater than about 200 $m^2/g$ and which are fragmentable during mixing and/or injection into multiple fragments having particle sizes ranging from about 5 to 300 nanometers.

6 Claims, 1 Drawing Sheet

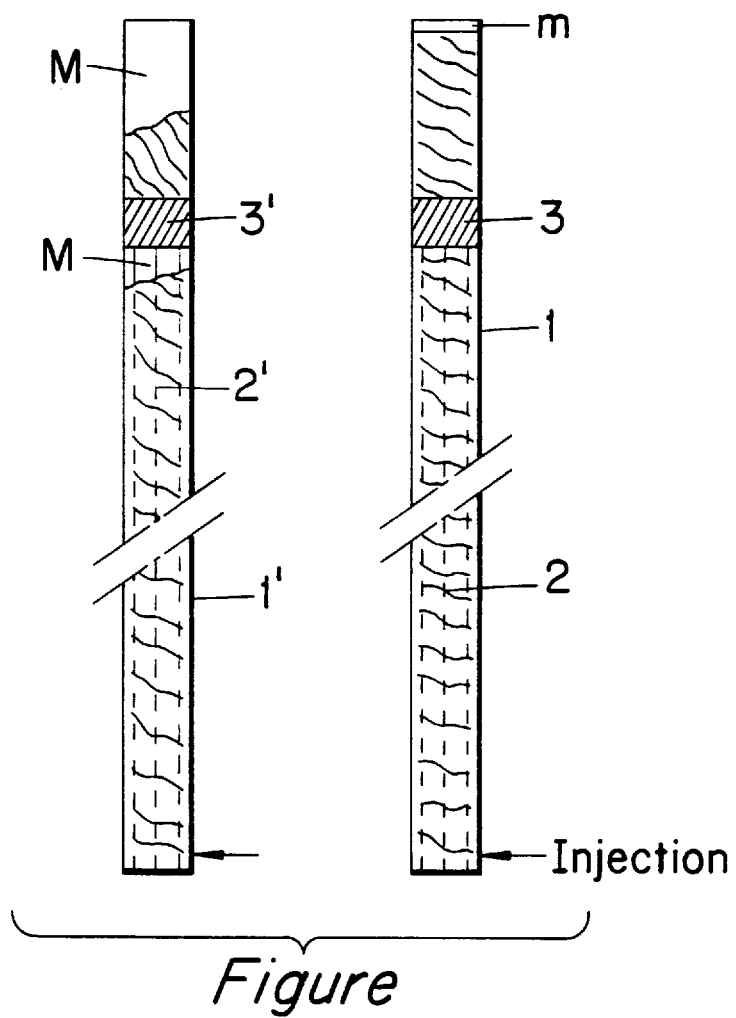
Figure

CEMENTATION SLURRIES FOR IMPROVEDLY ENCASING REINFORCING ELEMENTS THEREFOR

BACKGROUND OF THE INVENTION

1. Field of the Invention

The present invention relates to water- and cement-based cementation slurries which are injected to encase reinforcing means therefor, in particular to encase prestressed steel cables, frames, braces, trusses, and the like.

2. Description of the Prior Art

Satisfactorily encasing a prestressed steel armature, whether cable, frame, brace, truss, rod, wire, etc., is known to this art as being more difficult, the longer the encasing required. This length can be as much as 10 to 15 meters for a vertical cable, and several hundreds of meters for a longitudinal cable.

SUMMARY OF THE INVENTION

Accordingly, a major object of the present invention is the provision of novel cementation slurries for improvedly encasing a wide variety of reinforcing means/elements therefor.

Another object of this invention is the provision of improved cementation slurries which do not exude from settable consolidations or shaped structural units comprised thereof.

Yet another object of the present invention is the provision of improved reinforced cement/concrete structural units, the embrittlement of the reinforcing means encased therein, e.g., steel cables, wires, braces, trusses, etc., being markedly reduced.

Briefly, the present invention features easy-to-use, reduced-exudation cementation slurries comprising 1.5% to 3% by weight (with respect to the total weight of the cement composition) of hydrophilic particulates which are inert vis-a-vis the liquid constituents thereof, having a specific surface area of more than about 200 $m^2/g$ and which is divisible during mixing and/or injection into a plurality or multitude of fragments having particle sizes which can be as low as 5 nanometers and as high as 300 nanometers.

BRIEF DESCRIPTION OF THE DRAWING

The FIGURE of Drawing is a cross-sectional front view of two injection tubes, one containing a cementation slurry according to the invention and the other a conventional cementation slurry, as well as reinforcing means therefor.

DETAILED DESCRIPTION OF BEST MODE AND PREFERRED EMBODIMENTS OF THE INVENTION

More particularly according to the present invention, hydrophilic particles having a specific surface area ranging from 210 to 300 $m^2/g$, for example, are well suited for attaining the aforesaid objectives.

By the term "specific surface area", is intended the BET specific surface area, determined by the Brunauer-Emmet-Teller technique described in *The Journal of the American Chemical Society*, vol. 60, p. 309 (February 1938) and corresponding to ISO standard 5794/1.

Particles having an average dimension before fragmentation of less than 20 micrometers, preferably less than 15 micrometer, more preferably ranging from 0.3 to 1.5 micrometer and typically on the order of 0.5 micrometer, are preferably employed.

The preferred materials having the above characteristics are siliceous materials, typically an additive constituted by precipitated silica particles.

By the term "precipitated silica" is intended a silica obtained by precipitation via the reaction of an alkaline silicate with an acid, generally an inorganic acid, at a pH suitable for the medium of precipitation, in particular a basic, neutral or slightly acidic pH. Any suitable method for preparing the silica can be employed (adding acid to a silicate starting material, simultaneous total or partial addition of acid and silicate to an aqueous medium or to a silicate starting solution, etc.) and is selected as a function of the type of silica required, using known techniques.

The precipitated silica can be utilized in the form of a (dry) powder or, optionally, as an aqueous suspension (or slurry).

FR-A-2,621,036 describes the incorporation of silica into a cementation slurry to provide certain advantages. However, this patent relates to silica grains having significantly different physicochemical properties vis-a-vis the particles of precipitated silica suitable for use according to the present invention.

The hydrophilic particulates formulated into the compositions of the present invention are added to a cement slurry, the composition of which can be conventional. The proportions of hydrophilic particulates relative to the weight of the cement is not critical, except that particularly striking results are obtained when a proportion of 2 to 3 kg of precipitated silica per 100 kg of cement is observed.

Other than the hydrophilic particulates of the invention, the cementation slurry will normally contain other conventional additives, such as a setting-retardant, a liquefier, and the like.

In order to further illustrate the present invention and the advantages thereof, the following specific example is given, it being understood that same is intended only as illustrative and in nowise limitative.

In said example to follow, the apparatus/system shown in the accompanying Figure of Drawing was employed, illustrating two injection tubes respectively containing a cementation slurry according to the invention and a conventional cementation slurry, as well as the respective reinforcements therefor.

EXAMPLE

A cementation slurry was prepared by mixing the following constituents according to the indicated procedure:

4.9 liters of a fluidizing agent ("Melmentplast 40" marketed by SKW) and 1.6 liters of a setting-retardant ("Melretard" marketed by SKW) were added to 43 liters of water.

Intimate mixing of this formulation was carried out in the mixing zone of an injection machine (VSL mixer).

150 kg of cement (CPA HP PM du Havre marketed by Ciments Lafarge) and 3.75 kg of precipitated silica (Tixosil T331 marketed by Rhône-Poulenc) having a specific surface area of about 250 $m^2/g$, were added to the liquid fraction.

After three minutes of mixing, the cementation slurry had the following characteristics:

TABLE

| | MEASURED CHARACTERISTICS | STATUTORY SPECIFICATIONS (France) |
|---|---|---|
| Fluidity (Marsh cone Ø 10 mm at 20° C.) | Time  T = 0 h, 12 s<br>T = 1 h, 13 s<br>T = 3 h, 16 s<br>T = 6 h, 20 s | <24 s |
| Exudation | at 3 hours 0% | <2% |
| Shrinkage | at 28 days 2,160 × $10^{-6}$ m/m | <3,000 × $10^{-6}$ m/m |
| Mechanical strength (measured using prisms 4 × 4 × 16 cm) | at 28 days, compression: 95 MPa | >30 MPa |
| | at 28 days, bending: 7 MPa | >4 MPa |

The mixture of this Example remained liquid for 30 hours: depending on the particular application, this period of time can be modified by altering the amount of retardant, particularly when injecting about prestressed cables when their length is a factor.

The cementation slurry containing the precipitated silica settled out virtually not at all and encased the prestressed cable anchorages very well, whereas a conventional cementation slurry required a difficult repeat injection.

Referring specifically to the accompanying Figure of Drawing, the cementation slurry was injected at a pressure of 5 bars into the base of a transparent vertical tube 1, 4.5 m in length, containing reinforcing steel coils 2 and anchoring means 3 for the coils at the top of the tube. A conventional commercial cementation slurry was injected into an identical tube 1'. The tubes were compared after a number of hours.

Encasing defects M were observed 7 cm below the anchoring means and 17 cm above the anchoring means in the conventional cementation slurry, in the zones where optimum encasement was especially necessary, while the encasement had only a minimal defect (at 1 cm) at a distance from the anchoring means.

Twenty meter high prestressed cables were encased on site and confirmed the laboratory tests: the cementation slurry remained homogeneous during injection of the slurry and settled but very slightly subsequently, contrary to the ready-made commercial product produced for the site, which was already washed out at the top of the cable at the point in time of injection, necessitating supplemental injection for several cables.

It will be appreciated that, compared with the silica ash whose use is described above, precipitated silica presents the following particular advantages:

(a) precipitated silica can fix water better and can thus very substantially reduce exudation which is one of the principal problems when injecting around cables;

(b) the absence of free silicon in precipitated silica connotes that no nascent hydrogen is produced;

(c) for the same performance (settling and exudation), the amount of precipitated silica required is substantially lower than the amount of silica ash which would be required;

(d) since a wide range of precipitated silicas is available, it is possible to select the most suitable precipitated silica to provide the desired fluidity and thixotropy. This is not possible when using silica ash, as it is only available as a byproduct.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. In a cementitious composition of matter containing a cement matrix for use in encasing a reinforcing element therefor while reducing the risk of embrittlement thereof, the improvement which comprises from about 1.5% to 3% by weight of precipitated silica particles having an average size ranging from 0.3 to less than 20 micrometers which have a specific surface area of greater than about 200 $m^2$/g and which are fragmentable during mixing and/or injection into multiple fragments having particle sizes ranging from about 5 to 300 nanometers.

2. The cementitious composition as defined by claim 1, said hydrophilic particulates having an average particle size of less than 15 micrometers.

3. The cementitious composition as defined by claim 1, comprising from about 2 to 3 kg of precipitated silica particles per 100 kg of cement.

4. An aqueous cementation slurry comprising the cementitious composition as defined by claim 1.

5. An aqueous cementation slurry comprising the cementitious composition as defined by claim 1.

6. The cementitious composition as defined by claim 1, further comprising a setting-retardant, a liquefying agent, or mixture therof.

* * * * *

UNITED STATES PATENT AND TRADEMARK OFFICE
CERTIFICATE OF CORRECTION

PATENT NO. : 5,814,145

DATED : September 29, 1998

INVENTOR(S) : Jerome DUGAT et al.

It is certified that error appears in the above-identified patent and that said Letters Patent is hereby corrected as shown below:

Title page item [73], after "France" insert --Bouygues, 1, Avenue Eugene Freyssinet, 78061 Saint Quentin En Yvelines Cedex, France--.

Signed and Sealed this

Fourteenth Day of September, 1999

Attest:

Q. TODD DICKINSON

*Attesting Officer*   *Acting Commissioner of Patents and Trademarks*